INVENTORS
ERNEST A. VERRINDER
BOYD W. ROSE
BY Francis W. Anderson
ATTORNEY

FIG_21

FIG_22

FIG_23

FIG_24

FIG_25

FIG_26

INVENTORS
ERNEST A. VERRINDER
BOYD W. ROSE

BY Francis W. Anderson
ATTORNEY

United States Patent Office 3,403,816
Patented Oct. 1, 1968

3,403,816
CONTAINER-HANDLING APPARATUS
Ernest A. Verrinder and Boyd W. Rose, Riverside, Calif., assignors to FMC Corporation, San Jose, Calif., a corporation of Delaware
Filed Feb. 2, 1966, Ser. No. 524,399
5 Claims. (Cl. 221—221)

ABSTRACT OF THE DISCLOSURE

A plurality of egg cartons are arranged in a stack and are adapted to be individually dispensed from the bottom of the stack to an underlying conveyor. A first pair of opposed fingers are received under the lowermost carton while second and third pairs of opposed fingers are initially received between the lowermost carton and the carton thereabove. The first and second pairs of fingers are lowered to the conveyor to strip the lowermost carton from the stack while the third pair of fingers holds the remainder of the stack. When the first and second pairs of fingers are moved back to their upper positions, the third pair of fingers releases the stack allowing it to be caught by the first pair of fingers.

---

The present invention concerns container dispensing apparatus which is disclosed but not claimed in United States patent application Serial No. 524,901 of Harold J. Mumma, filed on even date herewith and entitled "Container Handling Apparatus."

This invention relates to container handling apparatus and, more particularly, it concerns an improved apparatus for separating a container from a stack of containers and depositing it on a receiving surface.

Container dispensing mechanisms are usually adapted to handle only one type of container. For example, one type of dispenser is arranged to handle egg cartons while another is adapted to dispense egg flats. Since commercial egg processing plants must package eggs in cartons and in flats, it is necessary that dispensing mechanism suitable for handling both cartons and flats be available in such plants. Further, it is desirable that the operation can be changed from a carton-filling operation to a flat-filling operation and vice versa with a minimum of non-operating or down time.

Accordingly it is an object of the present invention to provide a container dispensing apparatus adapted to handle a plurality of different types of containers.

Another object is to provide a container dispenser that may be converted from an arrangement for handling one type of container to an arrangement for handling another type of container with a minimum of manipulation and a minimum of down time.

A further object is to provide a novel, efficient container dispensing mechanism.

Another object is to provide a unique, advantageous carton-control finger system for a carton dispenser.

Other and further features and advantages will be apparent from the following description taken in connection with the accompanying drawings in which.

Figure 1:
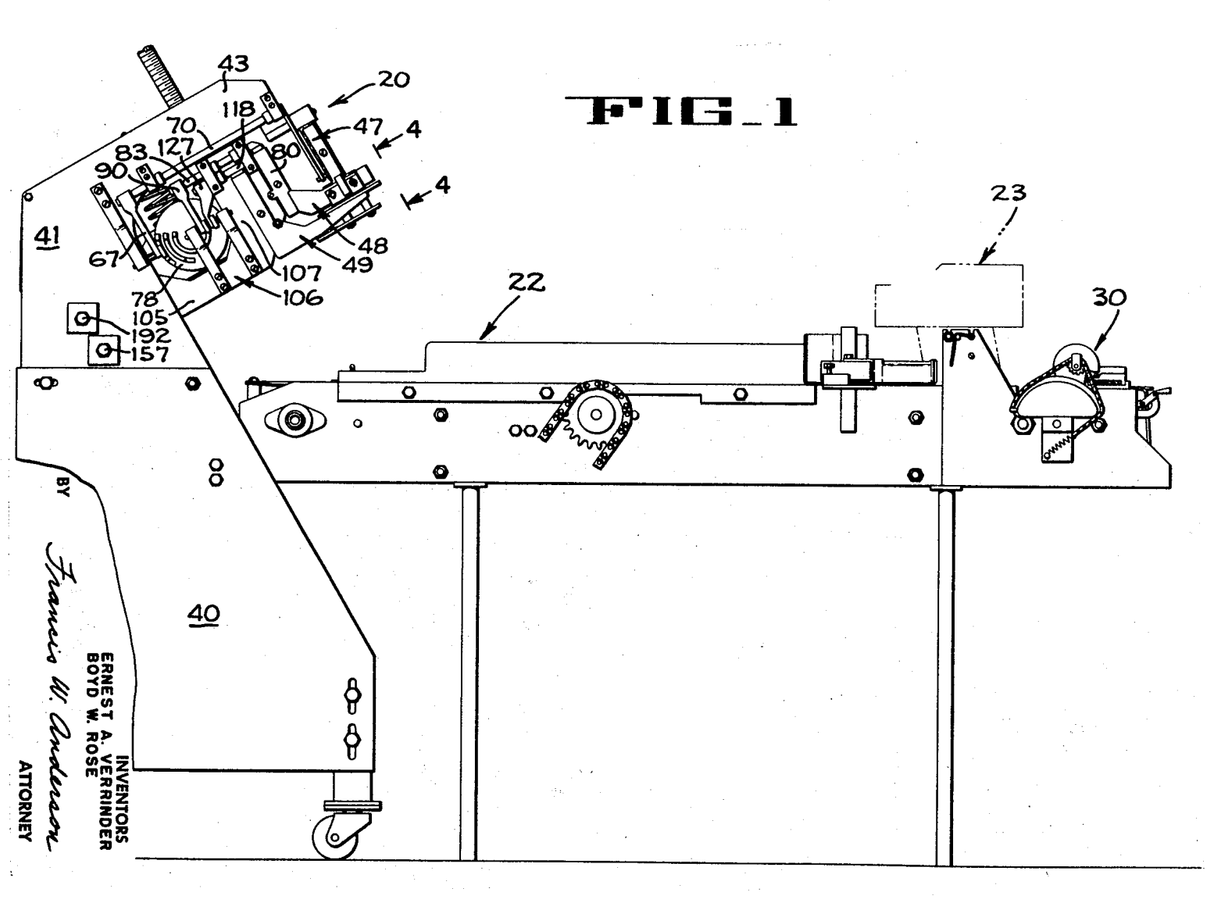
FIGURE 1 is a diagrammatic side elevation of a container dispenser, constructed in accordance with the teaching of the present invention, shown associated with a container conveyor.
Figure 2:
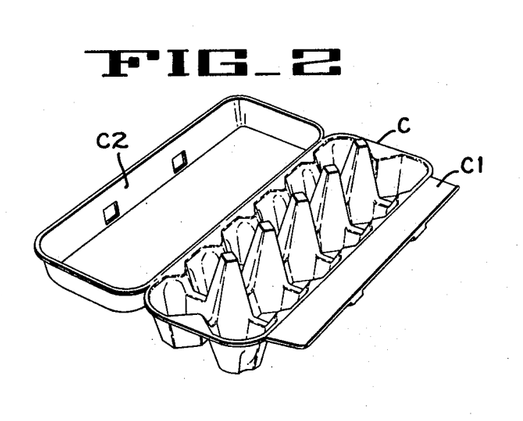
FIGURE 2 is a perspective of a carton of the type handled by the dispenser of the present invention.

The embodiment of the invention chosen for disclosure in FIGURE 1 comprises a de-nester unit 20 which is adapted to hold a plurality of egg containers, either cartons C (FIG. 2) or flats F (FIG. 3), in nested relation and to deposit them one-by-one on an endless conveyor member of a container-advancing unit 22. Each container is intermittently advanced from left to right (FIG. 1) and eventually each transverse row of pockets of the container is stopped under an egg-delivery conveyor 23 which is provided with a series of openable egg carrier buckets disposed in single file. This conveyor 23, which does not form part of the present invention, is part of an egg-processing machine, such as that disclosed in the patent to Mumma No. 2,895,274, in which eggs are inspected and graded and delivered to the single file bucket conveyor 23. It will be understood that the combination container-de-nester and delivery assembly of FIGURE 1 is one of several units that are placed side by side so that they can all receive eggs from the same egg-delivery conveyor 23.

When cartons are being filled, each carton is advanced to a position adjacent a carton closing mechanism 30 (FIG. 1) that folds a forward locking flange C1 (FIG. 2) of the carton upwardly and then swings a cover C2 of the carton down over the eggs and into locked engagement with the locking flange. When flats are being filled, the closing mechanism 30 is de-activated since the flats do not have a cover.

The de-nester unit 20 is adapted to dispense either cartons or flats and, in general, it comprises a wheeled support frame 40 (FIG. 1) having two rigid side walls 41 and 42 (FIG. 6) that are held in fixed spaced relation by rigid cross braces. Each side wall has an upper, outwardly-extended arm 43, the forward portion of which has a plate 44 (FIGS. 10–11) rigidly secured thereto in depending relation to form one wall of a magazine in which the containers are temporarily stored. An internal support housing 45 (FIGS. 10–11) is mounted between the two spaced arms 43, said housing including a plate 45a welded to the inner face of each arm 43 and a plate 45b that is disposed at an angle to the vertical and welded between the two plates 45a to form the rear wall of the magazine. The containers are disposed in superposed nested relation in the magazine, as indicated in phantom lines in FIGURE 6 and diagrammatically in FIGURE 7.

The containers are retained in the magazine and dispensed therefrom by three pairs of fingers 47, 48 and 49 (FIG. 7), each pair including a finger disposed adjacent side wall 41 that is a mirror image of the finger on the side wall 42. Since the fingers and their actuating mechanisms are identical, only oppositely disposed, a description of the finger of each pair that is associated with only one of the side walls will be described.

The upper finger 47 associated with wall 42 (FIG. 13) includes an arm 52 that is pivotally mounted on a cylindrical rod 53 which has an enlarged portion 53a welded to a plate 54 which is, in turn, secured by screws to the end portion of the extension 43 of the magazine side wall. The finger 47 also includes an angle plate 55 which comprises an upright wall 56 and a pair of container support ledges 57 that are normal to the wall 56 and project inwardly of the magazine. An inner serrated surface 58 is provided between the ledges 57. The angle plate is secured to an enlarged lower end portion 52a of the arm 52 by capscrews 59 that extend through slots 60 in the upright wall 56 and are threaded into the lower arm portion 52a. The slots 60 make it possible to adjust the vertical position of the angle plate 55. This adjustment is necessary because the ledge 57 must have a different position when cartons are being dispensed than when flats are being dispensed.

Figures 6, 7, 8, 9:
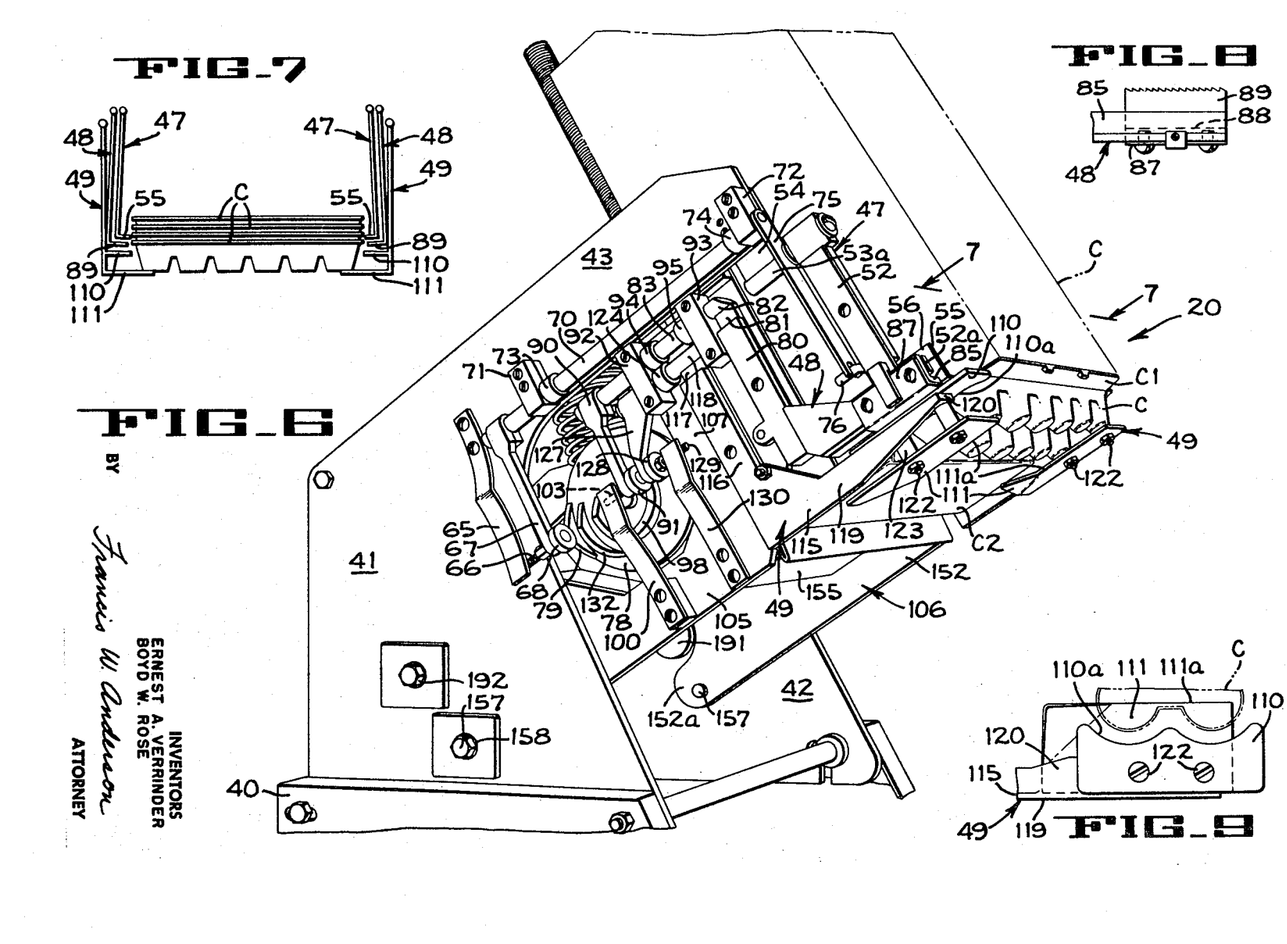
FIGURE 6 is an enlarged fragmentary perspective of a portion of FIGURE 1.
FIGURE 7 is a diagrammatic front elevation of the control fingers of the dispenser of FIGURE 6, the view being taken looking in the direction of arrows 7—7 of FIGURE 6.
FIGURE 8 is a fragmentary plan, at reduced scale, of a portion of one of the fingers, the view being taken looking in the direction of arrows 8—8 of FIGURE 4.
FIGURE 9 is a fragmentary plan, at reduced scale, of a portion of one of the fingers, the view being taken looking in the direction of arrows 9—9 of FIGURE 4.

The upper finger 47 is urged inwardly of the magazine by means of a leaf spring 65 (FIG. 6). For purposes of clarity the actuating mechanism for the upper finger 47 associated with wall 41 (FIG. 6) will be described rather than that associated with wall 42. The spring 65 is secured to the magazine side wall and has a lower end bearing against a threaded pin 66 which is secured to the lower end of a lever 67 and carries a rotatable cam follower roller 68. The lever 67 is clamped on one end of a shaft 70 which is rotatable in two spaced bearings 71 and 72 and is held in place by two set collars 73 and 74, that are secured to shaft 70. A second lever 75 is secured in any suitable manner to the other end of shaft 70 for rotation therewith. The second lever 75 has a slot at its lower end that receives an offset end of a pin 76 which is carried by the arm 52.

The roller follower 68 rides along the surface of a rotatable face cam 78 that has a raised camming track 79. As the cam rotates, the track 79 passes under the roller follower 68 and swings the lever 67, the shaft 70 and the lever 75 in a clockwise direction (FIG. 6), causing the upper finger 47 to be swung outwardly of the magazine. When the track 79 passes from underneath the follower 68, the spring 65 urges the lever 67, the shaft 70 and the lever 75 counterclockwise to move the angle plate 55 inwardly of the magazine to a position under the peripheral edge of the carton or flat.

The middle finger 48, that is associated with wall 41, comprises a lever 80 that is secured to a plate 81 which is welded to a flattened end 82 of a shaft 83. The finger 48 includes an angle bar 85 that is welded to the lower end of lever 80. A second angle member 87 is secured to the angle bar 85, said member 87 having an upwardly projecting abutment member 88 against which an inner edge of a toothed stripper or container-separator member 89 abuts. The stripper is locked between the angle bar 85 and the member 87 and the points formed on its inner edge are adapted to grip side surfaces of a container so that, when the stripper is lowered, the lowermost container of the stack of containers is moved downwardly away from the nested containers thereabove.

The middle finger 48 is moved toward and away from the containers in the magazine by means of a lever 90 (FIG. 6) that has a cam follower roller 91 on its lower end and is clamped on shaft 83. The shaft 83 is journalled for rotation in spaced bearings 92 and 93, and held in place by set collars 94 and 95. The cam follower roller 91 rides on the surface of the rotary cam 78, and, when a camming strip 98 passes under roller 91, the lever 90, the shaft 83 and lever 80 are swung clockwise (FIG. 6) to move the middle finger 48 away from the containers. When the camming strip 98 passes from under the roller 91, a spring 100 swings the lever 90 and the finger 48 inwardly, the spring 100 having one end portion bearing against a pin 103, that is carried by lever 90, and an opposite end secured to a wall 105 of a pivot housing 106. It is to be noted that the wall 105 has an upwardly projecting plate portion 107 on which the bearings 92 and 93 are mounted.

Figure 4:
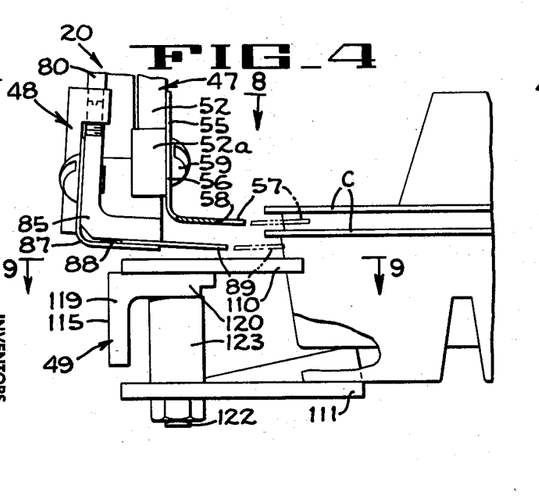
FIGURE 4 is an enlarged front elevation of a portion of the dispenser of FIGURE 1, the view being taken looking in the direction of arrows 4—4, one position of the fingers of the dispenser being shown during operation with egg carton of the type shown in FIGURE 2.
Figure 5:
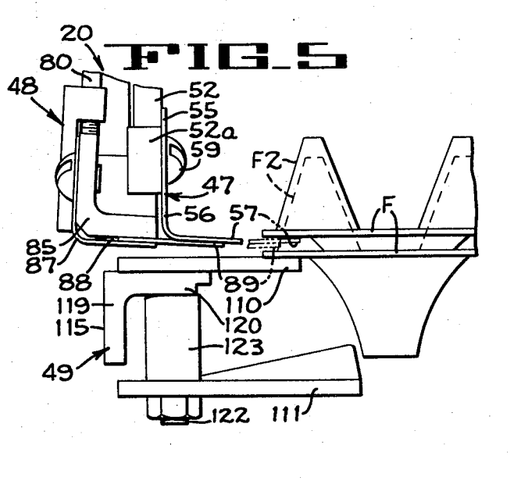
FIGURE 5 is a view similar to FIGURE 4 but showing the fingers during operation with egg flats of the type shown in FIGURE 3.

The lower finger 49 is a composite member having an upper filler flat support member 110 adapted to support a stack of filler flats and a lower carton support member 111 adapted to support a stack of cartons. While these two members are fixed parts of the lower finger member 49, they are used alternately, as shown diagrammatically in FIGURES 4 and 5. Also, it should be noted in FIGURE 9 that the carton support member 111 has a straight inner edge 111a while the filler flat member 110 has a scalloped edge 110a.

The lower finger 49 comprises an arm 115 (FIG. 6) having an upper portion 116 bolted to a plate 117 that is welded to a shaft 118. A portion 119 of arm 115 projects at right angles to the member 116 and is provided with a flat strap 120 on which the filler flat support member 110 is secured by two bolts 122 that extend through the filler flat member 110 and the strap 120, and through spacer sleeves 123 to mount the carton support member 111.

The shaft 118 is journalled for rotation in the bearings 92 and 93 and held in place by a set collar 124 on one side of bearing 92 and a lever 127 positioned on the other side of the bearing. The lever 127 is clamped on shaft 118 and has, at its lower end, a cam follower roller 128 mounted on a stud 129. A spring 130 is anchored on the wall 105 of the pivot housing 106 and has an end portion bearing against the stud 129 to pivot lever 127 and move the lower finger inwardly toward the containers in the housing. The follower roller 128 rides along the surface of the rotary cam 78 and, when it rides up a camming strip 132 carried by the cam, the lower finger unit is swung outwardly of the magazine and away from the containers therein. When the strip 132 moves out from under the roller 128, the spring 130 swings the finger unit 49 inwardly.

Figure 10:
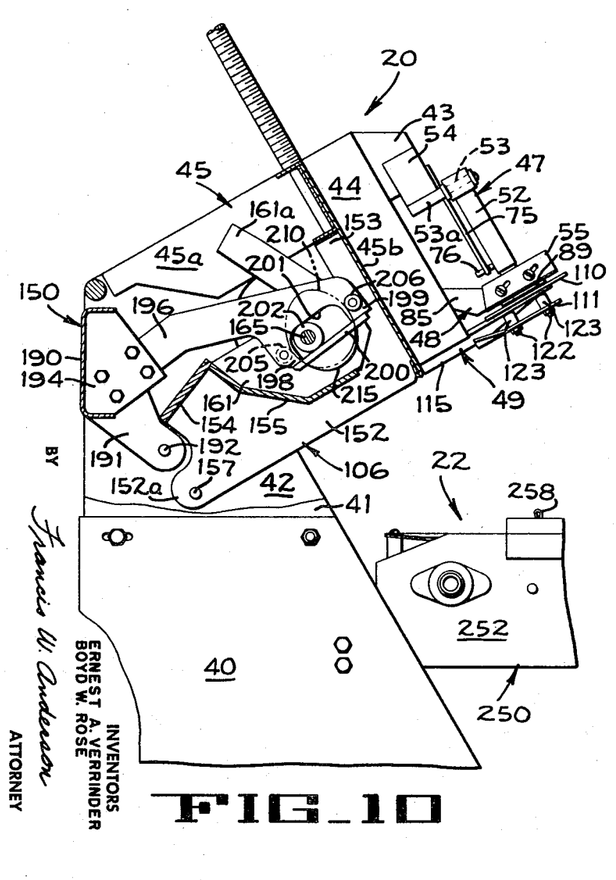
FIGURE 10 is an enlarged diagrammatic side elevation of the dispenser of FIGURE 1, with parts broken away.
Figures 11, 12:
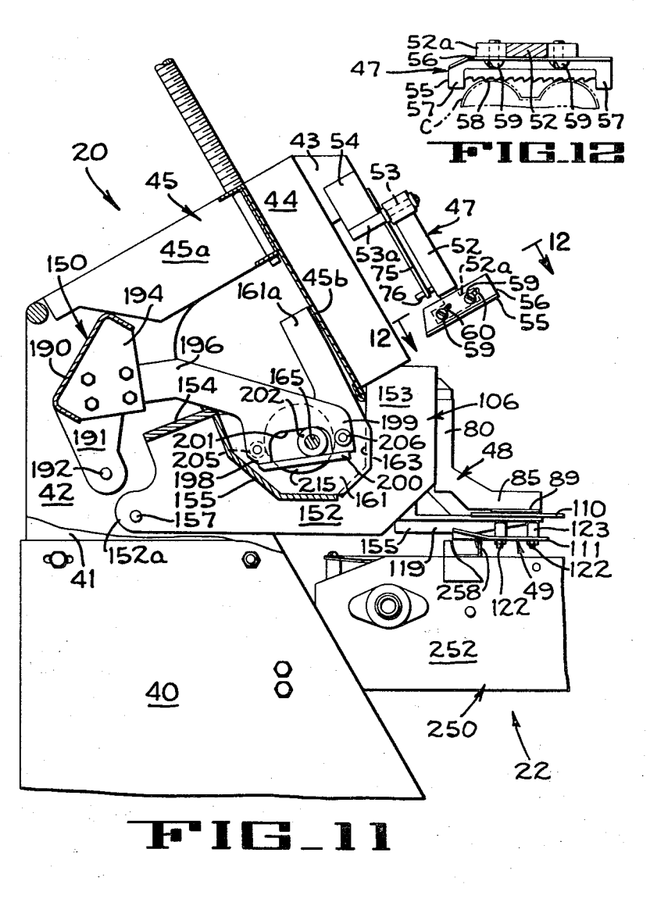
FIGURE 11 is a view similar to FIGURE 10 but showing the mechanism in a different operating position.
FIGURE 12 is an enlarged section taken along line 12—12 of FIGURE 11.

Referring to FIGURES 10 and 11, it will be seen that the upper finger units 47 are part of the fixed structure and always remain in substantially the same vertical position. On the other hand, the middle finger units 48 and the lower units 49 move downwardly to strip the lowermost container from the magazine and position it on the container-advancing conveyor 22. This oscillating movement of the units 48 and 49 is accomplished by the conjoint action of the pivot housing 106 (FIGS. 10–11) on which finger units 48 and 49 are mounted and a control housing 150. The pivot housing 106 includes the wall 105 (FIG. 6) and an identical wall 152 that is spaced from wall 105 and is connected thereto by transverse plates 154 and 155 (FIG. 13) to form a rigid pivot member. The side wall 152 has a lower end portion 152a pivotally mounted on the fixed wall 42, an upstanding wall 153 on which bearings are mounted, and the side wall 105 has a similar lower end 105a (FIG. 14) pivoted on the fixed side wall 41. Each of these pivot connections is provided by a screw 157 that is threaded into the lower end portions 105a or 152a, and has its head bearing against the inner race of an anti-friction bearing unit 158 carried by the housing wall.

Figure 13:
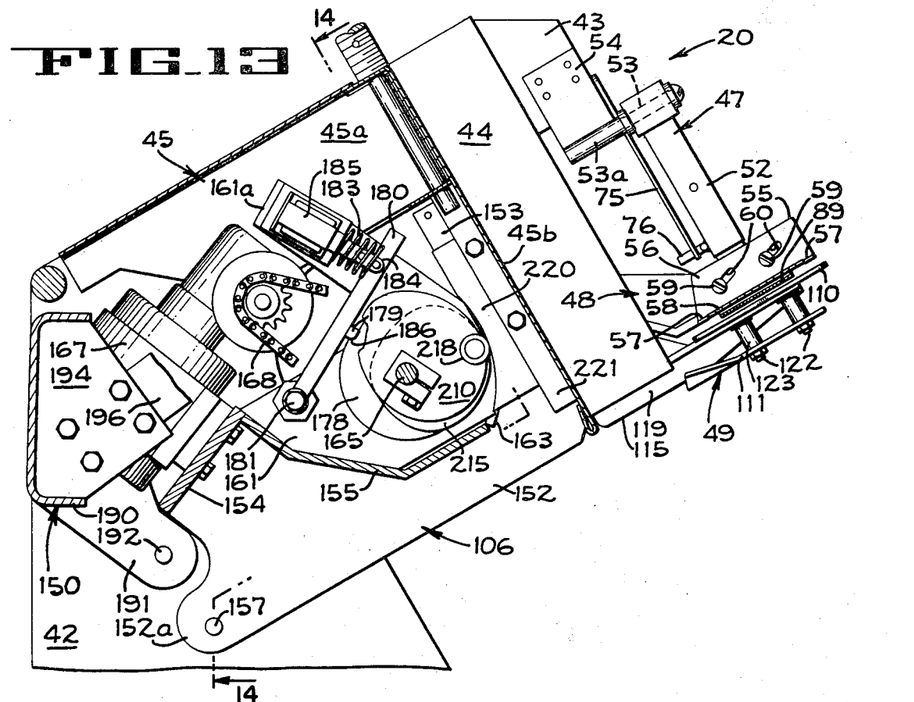
FIGURE 13 is an enlarged vertical section through the dispenser, particularly showing the drive mechanism for lowering certain fingers of the dispenser.
Figure 14:
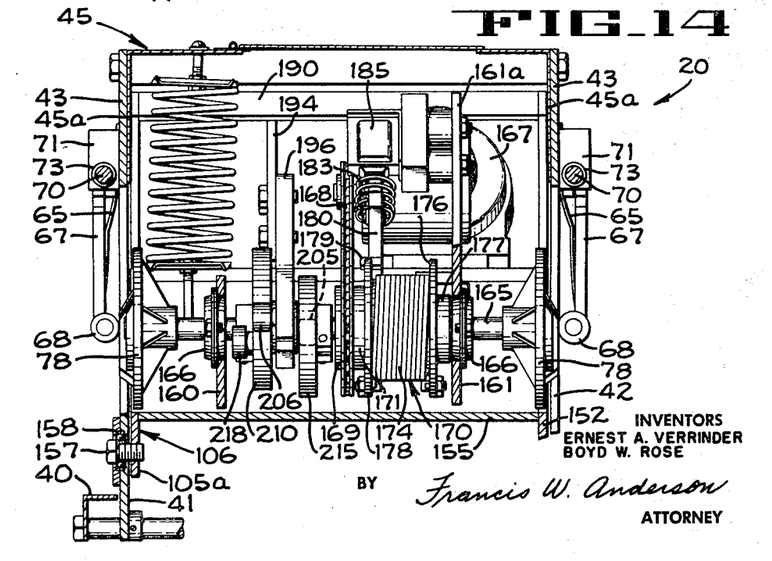
FIGURE 14 is a vertical section taken substantially along line 14—14 of FIGURE 13.
Figure 15:
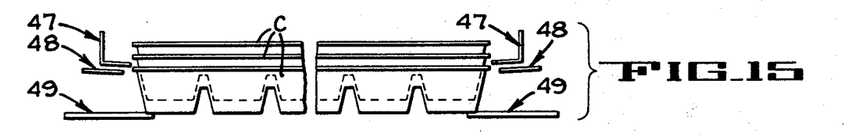
FIGURES 15–20 are schematic showings of the fingers of the dispenser, showing various positions of the fingers during the dispensing of a carton.
Figure 16:
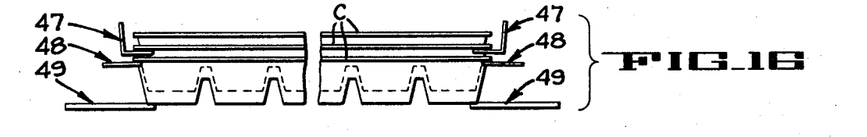

The pivot housing 106 includes a pair of vertical plates 160 and 161 (FIG. 14). As seen in FIGURE 11, the plate 161 is welded to the transverse plate 155 and is connected to the wall 152 by a laterally extending brace 163. The plate 161 has an upwardly extending arm 161a integrally formed thereon. Plate 160 is welded in place in the same manner as plate 161 and is identical to plate 161, except that it has no upwardly projecting arm similar to arm 161a. A shaft 165 is rotatably supported by the two plates 160 and 161, being disposed in a bearing 166 (FIG. 14) mounted in each plate. The shaft 165 is driven from a motor 167 through a chain 168 that is trained around a sprocket 169 of a clutch unit 170. This clutch is an over-running clutch of the type disclosed in the patent to Mumma No. 3,112,023 and in general comprises a drive member 171 on which the sprocket 169 is formed and which has a cylindrical member disposed inside a coil spring 174. A driven member 176, which has a hub 177 setscrewed to the shaft 165, also has a cylindrical portion underlying the spring 174. One end of the spring 174 is connected to the driven member 176 while the other end is anchored in a ratchet wheel 178 that is freely rotatable on the drive member 171. The ratchet wheel 178 is controlled by a pawl 179 (FIG. 13) carried by a lever 180 which pivotally mounted on the plate 161 by means of a mounting member 181. A spring 183 disposed around the plunger 184 of a solenoid 185 urges the lever 180 in a clockwise direction (as viewed in FIG. 13) to keep the pawl in front of a trailing wall 186 provided by a notch in the ratchet wheel.

When the motor is running, the drive member 171 is continuously rotated in a clockwise direction about the shaft 165 (FIG. 13). When the pawl 179 is in the notch of the ratchet wheel, the coil spring 174 is subjected to an unwinding stress by the frictional engagement of the rotating member 171 and this stress tends to enlarge the diameter of the spring and maintain the spring out of driven engagement with the drive member 171. When the solenoid 185 is energized, the plunger 184 pivots lever 180 counterclockwise (FIG. 13) to disengage the pawl 179 from the ratchet wheel. The spring 174 may now contract to its normal diameter and grip the rotating member 171. Since one end of the spring is connected to the stationary driven member 176, the inertia of member 176 causes the spring to wind tightly around the rotating member 171 and rotate with it, forcing the driven member 176 to also rotate. During operation, the solenoid is energized only for the very short time necessary to withdraw the pawl from the notch in the ratchet wheel. As soon as the shaft 165 starts to rotate the solenoid is de-energized and the spring 183 urges the lever clockwise (FIG. 13). As a result, the rotation of the shaft 165 is arrested after one complete revolution.

The previously described rotary face cams 78 are keyed to opposite ends of the shaft 165 so that, when the shaft 165 is rotated through one complete revolution, the face cams 78 are also rotated through 360 degrees.

The control housing 150 (FIG. 10) comprises a transverse channel 190 that is welded to two arms 191 (one only being shown), each arm 191 being disposed close to one of the fixed side walls 41 and 42 and pivotally connected thereto by studs 192 which are mounted in the walls in the manner explained in connection with the studs 157 which mount the pivot housing 106. A vertical plate 194 is welded to the channel 190 and projects forwardly therefrom at a point intermediate the ends of the channel, as seen in FIGURE 14. A control arm 196 is bolted to and projects forwardly from the mounting plate 194. At its forward end the arm 196 is provided with a recess defined by two spaced arms 198 and 199. A plate 200 is secured across the ends of the arms 198 and 199 to close the recess and form a slot 201 that receives a roller 202 which is rotatable on the shaft 165.

Two rollers 205 and 206 are rotatably mounted on arm 196 adjacent the slot 201, roller 205 being adjacent one face of arm 196 while roller 206 is adjacent the other face of the arm. The roller 206 rides along the surface of a generally-oval lowering cam 210 which is shown in phantom lines in FIGURE 10 because it is ahead of the plane of section of FIGURE 10. The cam 210 is set-screwed to shaft 165 in eccentric relation thereto and the cam 210 is so configurated that when shaft 165 is rotated, the cam 210 bears against roller 206 and causes the arm 196 of the control housing to swing clockwise and downwardly (FIG. 10). Since the roller 202 is trapped in slot 201 and is part of the pivot housing 106, the pivot housing must move downwardly also.

The roller 205 rides along the surface of a generally circular cam 215 (FIG. 11) that is secured to the shaft 165 in eccentric relation and is so designed that, during the second half of the rotation of the shaft 165, the cam 215 bears against the roller 205 and urges it upwardly to return the pivot housing to its upper position.

The pivot housing is locked in its up position by means of a roller 218 (FIG. 13) that is carried by the cam 210. When the pivot housing is in the up position, the roller 218 engages a rigid arcuate locking strip 220 that is bolted to a flange 221 which is welded to the back wall 45b of the magazine. Any downward movement of the pivot housing will of course be a downward swinging movement about aligned studs 157. However, since the roller 218 moves with the pivot housing, its engagement with the arcuate surface of the locking strip 220 will prevent such downward movement.

When downward movement of the pivot housing is desired, rotation of shaft 165 will quickly swing the roller 218 out of engagement with the locking strip 220.

Figure 17:
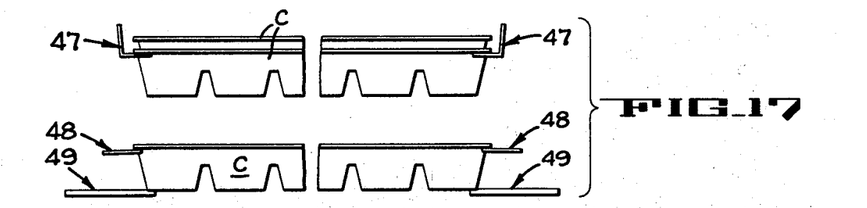
Figure 18:
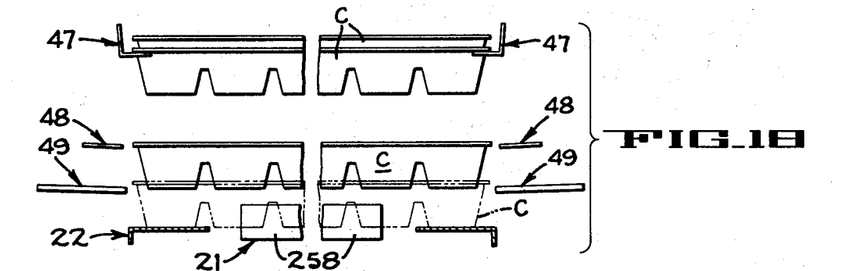
Figure 19:
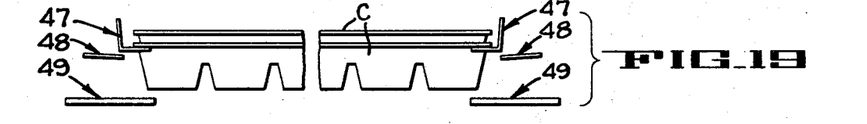
Figure 20:
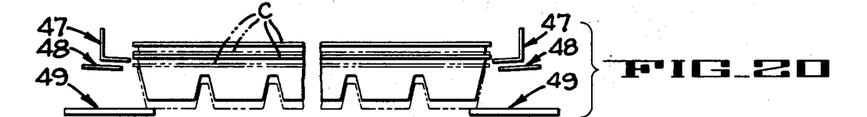
Figure 21:
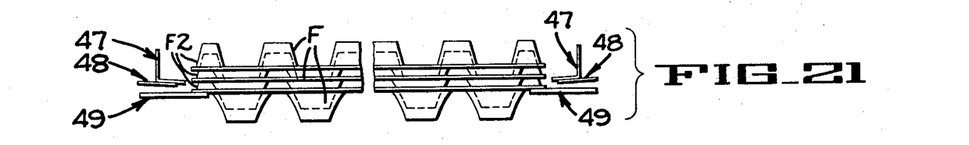
FIGURES 21–26 are schematic showings of the fingers of the dispenser, showing various positions of the fingers during the dispensing of an egg flat.
Figure 22:
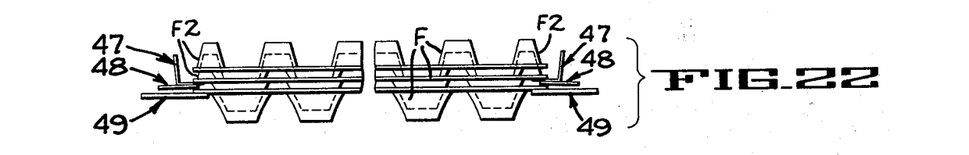
Figure 23:
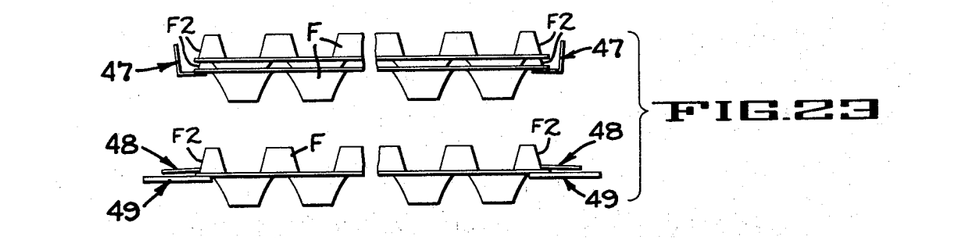

In FIGURES 15–20 the sequence of operations followed by the fingers 47, 48 and 49, when cartons C are being dispensed, is shown diagrammatically. At the beginning of a cycle (FIG. 15) the stack of cartons is held in elevated position by the lower fingers 49. When a signal is received indicating that a carton must be dropped onto the feed conveyor, the solenoid 185 (FIG. 13) is energized to withdraw the pawl 179 and permit camshaft 165 to be driven for one complete revolution. During the first 35° of rotation of the camshaft, the upper fingers 47 move into position below the peripheral ledge of the carton that is above the lowermost carton (FIG. 16), while serrated stripper fingers 48 move into gripping engagement with the end surfaces of the lowermost carton. At this time, the pivot housing 106 (FIG. 10) is moved downwardly, carrying the stripper fingers 48 and the lower fingers downwardly to separate the lowermost carton from the stack which is held in elevated position by the upper fingers 47 as shown in FIGURE 17. It should be noted that the serrated or sharpened edge 58 of the fingers 47 (FIG. 12) actually grips the end surfaces of the carton. When the pivot housing reaches a lowered position, the lower fingers 49 are swung outwardly to drop the carton onto the container-advancing conveyor 21. The pivot housing starts upwardly and, during this upward movement, the lower fingers 49 are swung inwardly to their original carton-supporting position (FIG. 19). Finally, the upper fingers 47 are swung outwardly to drop the stack onto the lower fingers 49, as indicated in FIGURE 20.

Figure 3:
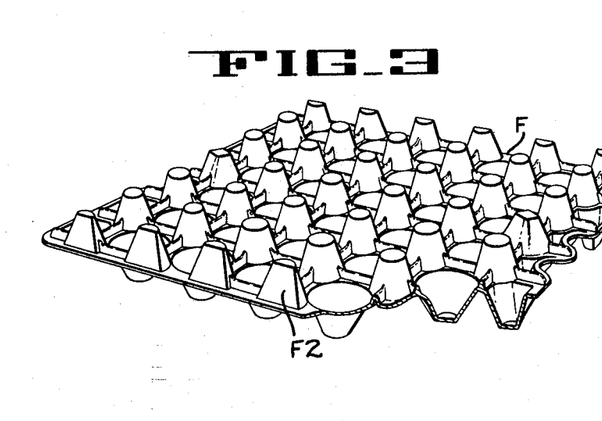
FIGURE 3 is a perspective, partly broken away, of an egg flat.

In FIGURES 21–26, the sequence of movements of the fingers when flats F are being dispensed is shown. At the beginning of the cycle the stack is supported on the lower fingers 49. During the first portion of the rotation of the camshaft, the upper fingers 47 and the stripper fingers 48 are moved into position between the lowermost flat and the flat next above, the sharpened inner edges of the middle fingers being adapted to grip a flattened wall portion F2 (FIG. 3). By comparing FIGURES 15 and 21, it will be seen that in FIGURE 21, when the fingers are adapted for handling flats, each upper finger 47 is closer to the associated stripper finger 48 than it is when cartons are being dispensed. This adjusted position of the upper fingers 47 is obtained by means of the adjustment afforded by the slots 60 (FIG. 11) in the upper finger mountings.

Figure 24:
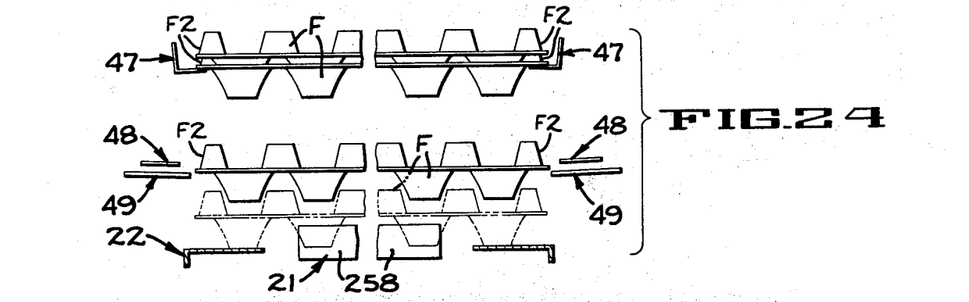
Figure 25:
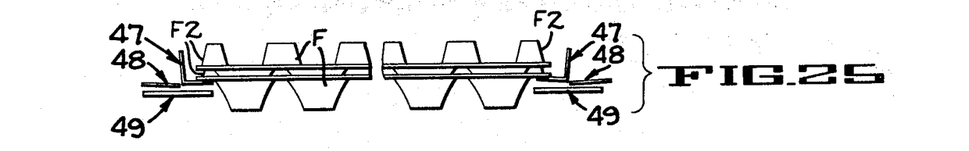
Figure 26:
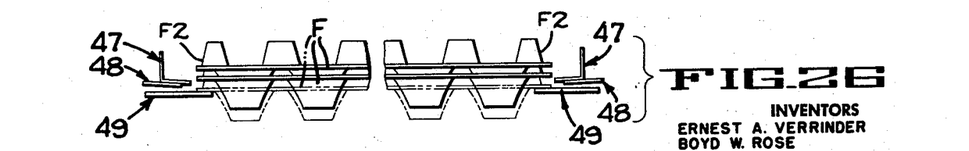

After fingers 47 and 48 are positioned above the lowermost flat, the pivot housing 106 is lowered (FIG. 23) to separate the lowermost flat from the stack. When the pivot housing reaches a lowered position, the fingers 48 and 49 are swung outwardly to drop the lowermost flat onto the conveyor 21 (FIG. 24). As the housing returns upwardly, the lower fingers 49 move inwardly to a position below the stack (FIG. 25) and then the upper fingers 47 are swung outwardly to drop the stack of flats onto the fingers 49.

The signal that causes actuation of the solenoid 185 and starts the container dispensing operation is preferably received from the memory system of the egg-processing machine that includes the bucket conveyor. Such a system is disclosed in the above-mentioned Mumma Patent No. 2,895,274 which is incorporated by reference herein and, in general, comprises means for controlling the discharge of the eggs from the bucket conveyor into the pockets of the containers, means for controlling the forward indexing movement of the container conveyor to position the rows of pockets under the conveyor, and means for energizing the solenoid 185 to move a container from the magazine to the conveyor so that it is properly positioned on the conveyor.

From the foregoing description it will be apparent that the present invention provides a unique container-dispensing apparatus which can be quickly converted from use with an egg carton to use with an egg flat by merely adjusting the position of each of the angle plates 55 of the upper fingers 47. Thus the conversion is made with a minimum of manipulation in a minimum of time while assuring that the containers will be accurately dispensed. The sharpened stripper fingers assure a positive lowering of the lowermost carton even though the stack is inclined relative to the vertical. If the containers are not tightly nested and the lowermost carton will separate easily the stripper fingers may be eliminated.

Having thus described the invention, what is claimed as new and desired to be protected by Letters Patent is:

1. A container dispenser comprising a support structure; means defining an open bottom container-storage magazine in said structure adapted to hold a stack of nested containers; a pair of upper stack-supporting fingers movably mounted on opposite sides of said housing and having container support members disposed adjacent the lower open end of said magazine, each support member being movable incident to actuation of said upper fingers between an inner stack-supporting position in supporting engagement with a peripheral edge of a container of the stack and a retracted position spaced outwardly from said supporting position; lower container discharge fingers movably mounted on opposite sides of said housing and having support members disposed below and adjacent the support members of said upper fingers, each support member of said lower fingers being movable incident to actuation of said lower fingers between a projected position underlying the stack of containers in said magazine in supporting engagement with a lower flat surface of the lowermost container and a withdrawn position spaced outwardly from the path of downward movement of the stack of containers; a pair of stripper fingers mounted on each side of said magazine, each finger having a container engaging member disposed between and adjacent the support members of said upper and lower fingers and movable from a withdrawn position into engagement with the side surface of the lowermost container at a point above the surface on the container supported by the support members of said lower fingers; and means for sequentially actuating said upper and lower fingers and said stripper fingers to first move the support members of said lower fingers to projected position to support the stack, then move the support members of said upper fingers into said inner position in supporting engagement with the periphery of the container next above the lowermost container in the stack and move the container engaging members of said stripper fingers into engagement with the lowermost container, then move the support members of said lower fingers and the container engaging members of said stripper fingers downwardly together while maintaining said support members of said lower fingers in their projected positions until the lowermost container is spaced below the remainder of the stack by a predetermined distance, and finally swing said lower fingers and said stripper fingers to said withdrawn positions to permit discharge of said container.

2. A dispenser according to claim 1 including means for adjusting the distance between the container support surface of each upper finger and the support surface of the adjacent lower finger whereby the dispenser can be adapted to handle containers of various designs in which the available contact surfaces of the lowermost container and the container next above in a stack of nested containers is spaced differently for each design.

3. A dispenser according to claim 2 wherein each of said lower container discharge fingers has first and second support members, said first support members extending parallel to and below said second support members and extending inwardly towards each other a greater distance than the second support members whereby said first support members are arranged to support the lowermost surface of a container of one design while the second support members are arranged to support the outwardly extending flange of a container of a different design with only one set of support members engaging either of said differently designed containers.

4. A dispenser according to claim 2 wherein each of said upper stack-supporting fingers comprises a support arm pivoted to said support structure, a slotted plate, means extending through the slot in the plate and engaging said arm for locking the plate in adjusted position on the arm, and a container-contacting member extending inwardly of the magazine from said plate.

5. A dispenser according to claim 1 wherein said container engaging members of said stripper fingers have inner sharpened container-contacting edges of serrated shape.

References Cited
UNITED STATES PATENTS

| | | | |
|---|---|---|---|
| 3,057,515 | 10/1962 | Loeser | 221—221 |
| 3,112,023 | 11/1963 | Mumma | 221—221 X |
| 3,297,201 | 1/1967 | Burt | 221—221 |

ROBERT G. SHERIDAN, *Primary Examiner.*

F. E. WERNER, *Assistant Examiner.*